(12) United States Patent
Steer et al.

(10) Patent No.: US 8,462,951 B2
(45) Date of Patent: Jun. 11, 2013

(54) METHOD AND APPARATUS FOR REDUCING PROBABILITY OF DETECTION, IMPROVING JAMMING RESISTANCE AND SECURITY FOR BROADBAND WIRELESS SYSTEMS

(75) Inventors: David Steer, Nepean (CA); Marcus Leech, Smiths Falls (CA)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 12/523,641

(22) PCT Filed: Jan. 16, 2008
(Under 37 CFR 1.47)

(86) PCT No.: PCT/CA2008/000065
§ 371 (c)(1),
(2), (4) Date: Jun. 8, 2010

(87) PCT Pub. No.: WO2008/086599
PCT Pub. Date: Jul. 24, 2008

(65) Prior Publication Data
US 2011/0033051 A1    Feb. 10, 2011

Related U.S. Application Data

(60) Provisional application No. 60/885,519, filed on Jan. 18, 2007.

(51) Int. Cl.
*H04L 29/06*    (2006.01)
(52) U.S. Cl.
USPC .............. 380/270; 380/35; 375/260; 375/261

(58) Field of Classification Search
USPC .................. 380/270; 375/260, 261; 370/335, 370/337, 208
See application file for complete search history.

(56) References Cited

U.S. PATENT DOCUMENTS

| | | | |
|---|---|---|---|
| 5,937,000 A * | 8/1999 | Lee et al. ...................... | 375/141 |
| 6,859,173 B2 | 2/2005 | Spilker, Jr. et al. | |
| 2004/0131007 A1 | 7/2004 | Smee et al. | |
| 2005/0175175 A1 | 8/2005 | Leech | |
| 2005/0180315 A1 * | 8/2005 | Chitrapu et al. ............... | 370/208 |
| 2005/0190739 A1 * | 9/2005 | Sparrell et al. ................ | 370/347 |
| 2006/0209766 A1 * | 9/2006 | Britz et al. .................... | 370/335 |
| 2007/0058595 A1 * | 3/2007 | Classon et al. ................ | 370/337 |

FOREIGN PATENT DOCUMENTS
WO    2006105004 A2    10/2006

OTHER PUBLICATIONS

Dafesh et al "A Portable UWB to GPS Emission Simulator", Position Location and Navigation Symposium, 2004. ISBN: 0-7803-8416-4, IEEE, Date of Current Version : Jul. 6, 2004 Issue Date : Apr. 26-29, 2004; 9 pages pp. 405-413.*

(Continued)

*Primary Examiner* — Taghi Arani
*Assistant Examiner* — Jason Lee
(74) *Attorney, Agent, or Firm* — Meyertons, Hood, Kivlin, Kowert & Goetzel, P.C.

(57) ABSTRACT

Systems and methods for generating OFDM signals are provided in which sub-carrier usage is selected and/or remapped in various manners. For example, in some embodiments remapping using a security sequence is employed; in other embodiments, decoy sub-carriers are employed; in other embodiments, mask sub-carriers are used to cover jammed portions of a channel.

13 Claims, 5 Drawing Sheets

OTHER PUBLICATIONS

Bender et al; IBM Systems Journal, vol. 35, Nos. 3&4, p. 313-336; 1996.*

Luengo et al., "Secure communications using OFDM with chaotic modulation in the subcarriers", 2005 IEEE 61st Vehicular Technology Conference, VTC 2005-Spring, May 30 to Jun. 1, 2005, vol. 2, pp. 1022-1026.

Nolan et al., "OFDM sub-carrier allocation algorithm for a multiple user data enhanced radio server (MUDERS) using a general purpose processor platform", Proceeding of the SDR 04 Technical Conference and Product Exposition, 2004, pp. 1 to 6, http://www.sdrforum.org/pages/sdr04/04.1%20WLANs%20Heyne/4.1-1%20Nolan.pdf.

* cited by examiner

METHOD AND APPARATUS FOR REDUCING PROBABILITY OF DETECTION, IMPROVING JAMMING RESISTANCE AND SECURITY FOR BROADBAND WIRELESS SYSTEMS

This application claims the benefit of and is a National Phase Entry of International Application Number PCT/CA2008/000065 filed Jan. 16, 2008, and claims the benefit of U.S. Provisional Patent Application No. 60/885,519 filed Jan. 18, 2007, which is hereby incorporated by reference in its entirety.

FIELD OF THE INVENTION

The invention relates to OFDM transmission systems, and to methods of improving low probability of detection (LPD), jamming resistance (JR) and low probability of intercept (LPI).

BACKGROUND OF THE INVENTION

Radio systems are sometimes used in environments where the signals must be protected from detection by others. The signals must be resistant to deliberate blockage and the information being transmitted must be protected from disclosure to others. These capabilities are often referred to as low probability of detection (LPD), jamming resistance (JR) and, low probability of intercept (LPI).

Commercial radio systems, including the broadband wireless communications systems based on OFDM technology such as those of the IEEE standard 802.16, are designed from the outset to operate in protected spectrum channels with low interference and noise. These radio systems are also designed to have signals that are easy to detect in order to minimise receiver costs and maximise performance. While these systems typically provide security for the users' data through traffic encryption, they provide little protection for the internal system control signalling and are readily detected and jammed. Typically the radio signal design includes many features which make them easy to detect, hence they have a high probability of detection by an outside observer.

Fundamentally, the commercial radio systems are designed to operate in dedicated spectrum with no (undue) interference from outside sources. Similarly, the signals are carefully designed with features that make them most easily detectable to receivers, particularly low cost mobiles. The radio transmissions, for example include pilot signals that are intended to act as beacons that are easy for the mobiles to detect, acquire synchronisation and lock to the system channels. Similarly, the timing of transmissions is organised with several regular periodicities that render the signal timing easy to detect and maintain. Such common timing co-ordination helps to ensure high capacity performance for the commercial system. The commercial systems also typically broadcast a paging channel that is used for coordination of the system information and remote station operation. The paging channel is also easy to detect and, if jammed, easily disrupts the operation of the whole system. In order to speed the acquisition by the mobile receivers of the base-station signals, they include prominent and regular features to permit the mobiles to quickly detect them and transfer calls from one station to another (i.e. "handover"). All of these features that are basic to a commercial radio system are opposite to the covertness and resistance to hostile jamming that are required by a military radio system.

FIG. 1 illustrates some of the basic characteristics of a broadband radio waveform. In this illustration time is in the horizontal direction generally increasing towards the right. In the vertical direction is generally shown the sub-carrier, or radio frequency, space of the transmissions. The signal is thus utilising the two dimensions of time and frequency in this illustration. There are other possible dimensions such as spreading code and frequency hopping that may be used but are not shown in this illustration. In the case of commercial transmission systems there are regular intervals for downlink and uplink flow of information. In this case downlink refers to the direction of transmission from the network to the user terminals and uplink refers to the direction from the user terminals to the network. In the case illustrated, Time Division Duplexing (TDD) is shown, in which the direction of transmission in a single transmission channel alternates between downlink and uplink. Radio communications systems may also use Frequency Division Duplexing (FDD) in which the two directions of transmission use channels in different portions of the radio spectrum. The transmissions of the radio system may be continuous, or they may occur only when devices have information to send to each other. In this case, transmission bursts with a format equivalent to that shown in FIG. 1 are sent when there is data or signalling to communicate, and there are no transmissions at other times.

The transmission for the downlink includes a number of elements. These include a preamble portion that may be used by the receivers to acquire the transmission timing, a broadcast control portion that may be used by receivers to learn the organisation, format and timing of the information in the transmission, common broadcast information for multiple users, and transmissions of data directed for individual user terminals. These transmissions may employ a combination of time, spreading code, frequency hopping or sub-carrier groupings for the elements.

The transmissions in the uplink are similarly divided into similar elements including preambles, control information and data from individual user terminals. These transmissions also may employ a combination of time, spreading code, frequency hopping or sub-carrier groupings for the elements.

FIG. 2 illustrates some of the features of a broadband radio waveform in the frequency domain. In this illustration the horizontal axis is the frequency space of the communications channel. The vertical axis shows the strength of signals at the various sub-carrier frequencies. Not shown is the phase of the multiple radio signals. This illustration shows that the communications channel may include modulated traffic sub-carriers that may be used for transmission of user data, pilot sub-carriers that may be used for synchronisation of the radio receivers and guard sub-carriers that may be used to separate the radio signals from other signals in the band. There may also be other sub-carriers in the channel that are introduced, for example, to control the Peak to Average Power Ratio (PAPR) of the radio signal. These sub-carriers typically do not contain any user information, but have a modulation state chosen to reduce the peak power of the composite signal. The illustration also shows that the pilot sub-carriers typically are transmitted with a higher power level and with a fixed modulation pattern that is known to the receivers. These known signals may be used by the receivers to estimate the radio channel and so improve the communications performance. The illustration shows the various sub-carrier signals in locations in the frequency space. In order to facilitate sampling of the radio channel and to provide robustness to interference, the allocation of sub-carriers to various functions changes from symbol to symbol. This variation, however, follows a fixed pattern that is well defined in the radio system standard and so does not prevent the signal feature detection by an adversary receiver.

FIG. 3 illustrates the general apparatus and process arrangement for forming the broadband radio waveform. This system processes user data (this may be Forward Error Coded (FEC)) from the scheduler and other parts of the transmitter system. This user data is gathered together with other pilot, PAPR and guard sub-carriers in a modulation format. This information is processed by an Inverse Fourier Transform (IFFT) process to form a time sequence. For most intervals of transmission, the time sequence symbols are appended with a cyclic prefix and frequency translated and amplified to form the desired radio frequency signal that is transmitted by the antenna. Typically, at the beginning of each transmission frame, preamble symbols (one or more) are introduced to mark the start of the frame. These symbols are designed for easy detection by the receivers using a known correlation pattern. In this illustration the preamble symbols are shown as being injected at the appropriate time through a switch after the IFFT. The preamble symbols may equivalently be introduced as special data patterns input to the IFFT, instead of the user data, at the preamble symbol times.

SUMMARY OF THE INVENTION

According to one broad aspect, the invention provides a method comprising: generating an OFDM signal in which sub-carrier usage is remapped with a security sequence.

According to another broad aspect, the invention provides a method comprising: generating an OFDM signal with reformatted preamble symbols through the application of a security sequence.

According to another broad aspect, the invention provides a method comprising: assigning identification codes (such as the preamble sequence) to transmission stations according to a security sequence in order to protect the identity of the individual stations.

According to another broad aspect, the invention provides a method comprising: generating an OFDM signal using variable timing directed by a security sequence for the modulation and/or framing rates.

According to another broad aspect, the invention provides a method comprising: generating an OFDM signal containing data, signalling and decoy channels, and using a security sequence to schedule user data, signalling and decoy channels.

According to another broad aspect, the invention provides a method comprising: modifying a set of modulation states through the use of a security sequence to produce a set of modified modulation symbols; generating an OFDM signal using the modified modulation symbols on each of a plurality of sub-carriers.

According to another broad aspect, the invention provides a method comprising: generating an OFDM signal including decoy sub-carriers to expand the bandwidth of the transmitted signal and to hop the true user data around in an expanded sub-carrier space.

According to another broad aspect, the invention provides a method comprising: generating an OFDM signal containing mask sub-carriers that may be placed to cover jammed portions of the channel.

According to another broad aspect, the invention provides a method comprising: generating an OFDM signal decoy and mask sub-carriers in which the modulation of the decoy and mask sub-carriers is coded to at least partially suppress the spectral signature of the transmission at the modulation and framing rate and to make the composite signal appear as a white noise signal.

In some embodiments, the method further comprises applying modulation of the decoy and mask sub-carriers at a different rate than the users data symbols to assist in suppressing the modulation spectral components.

In some embodiments, the further comprises in place of a cyclic prefix, using filters and IOTA/OQAM modulation formats to suppress detectability of the signal.

In some embodiments, the method further comprises: using external signals, such as GPS transmissions or broadcast TV signals, to provide key and synchronisation information for the waveform protection.

In some embodiments, the method further comprises transmitting the OFDM signal.

In some embodiments, each security sequence is a crypto sequence.

In some embodiments, each crypto sequence is a keyed crypto sequence.

In some embodiments, a method comprises: a combination of any two or more of the methods as summarized above.

In some embodiments, a transmitter is operable to implement the method as summarized above.

In some embodiments, a method comprises: receiving a signal generated using the method as summarized above; applying reverse operations to recover transmitted content.

In some embodiments, a receiver is operable to implement the method as summarized above.

In some embodiments, a system comprises at least one transmitter as summarized above in combination with at least one receiver as summarized above.

DETAILED DESCRIPTION OF THE EMBODIMENTS

Figure 1:
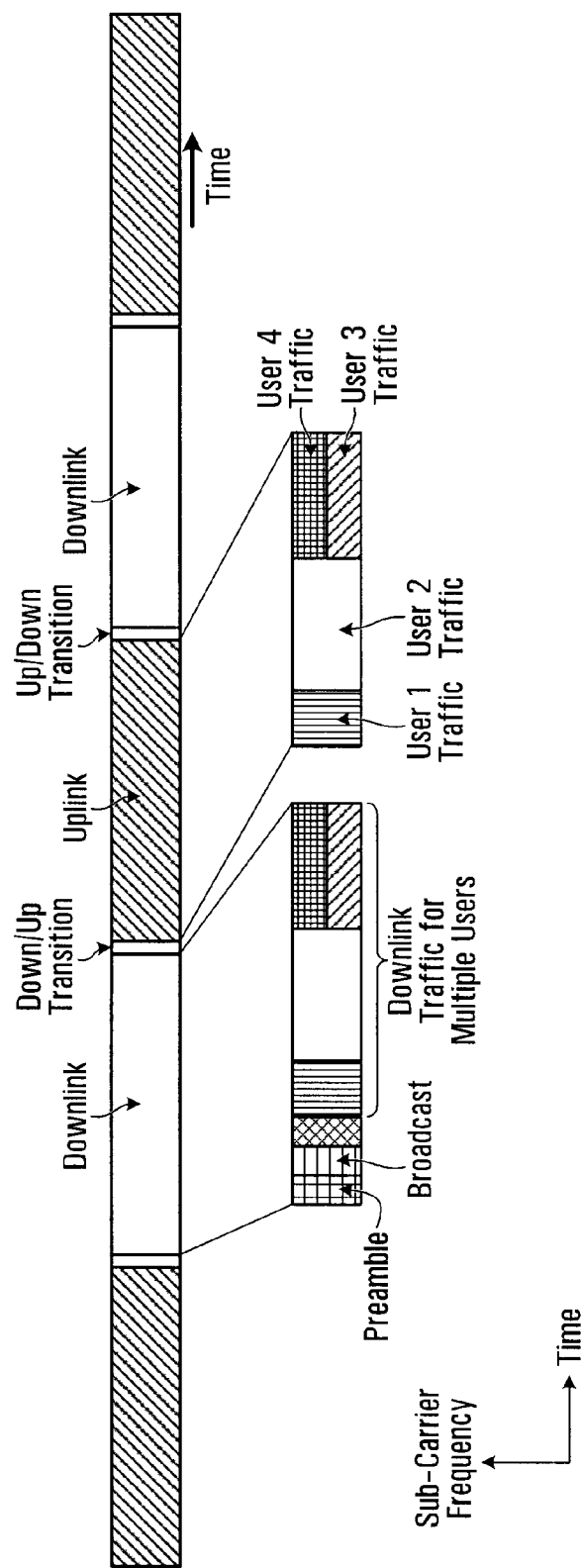
FIG. 1 is a schematic diagram of an example of a broadband radio waveform in the time domain.
Figure 2:
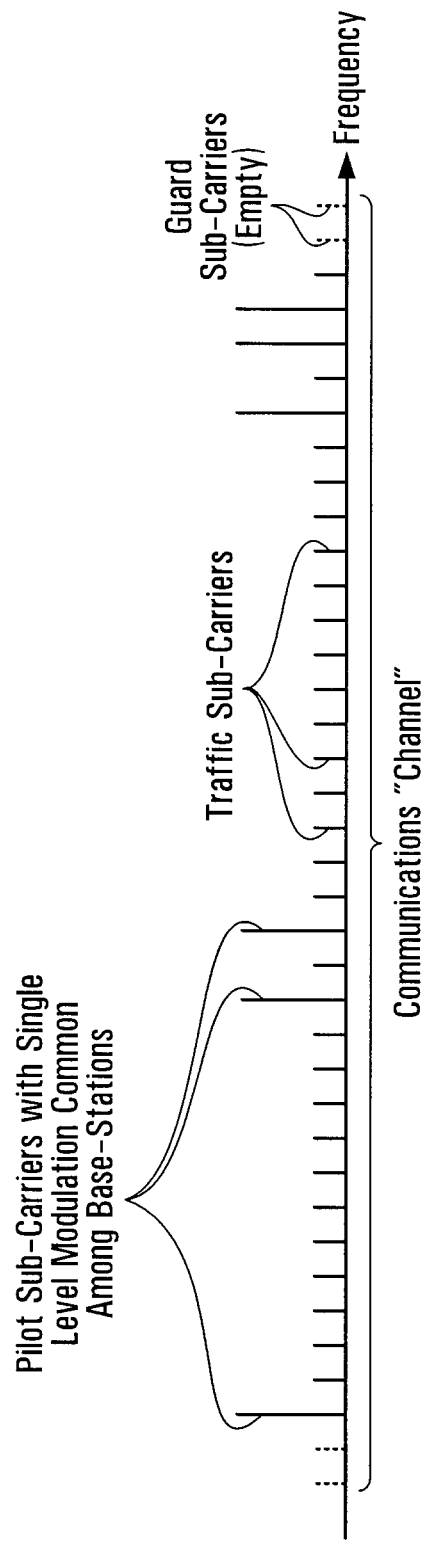
FIG. 2 is a schematic diagram of an example of a broadband radio waveform in the frequency domain.

FIGS. 1 and 2 show some of the features of the commercial communications waveform that make it easy for a hostile system to detect, to jam and to intercept the signals. The signal contains, as shown for example in FIG. 1, significant components at the TDD repetition rate and the symbol modulation rate. The preamble and broadcast communications symbols also are readily identifiable features for an adversary receiver. The control symbols are also easily identified and may be jammed to disrupt communications. As shown in FIG. 2, the pilot sub-carriers are readily detected and may be used to locate the transmission. By jamming the pilot sub-carriers, the communication may be easily disrupted.

Figure 3:
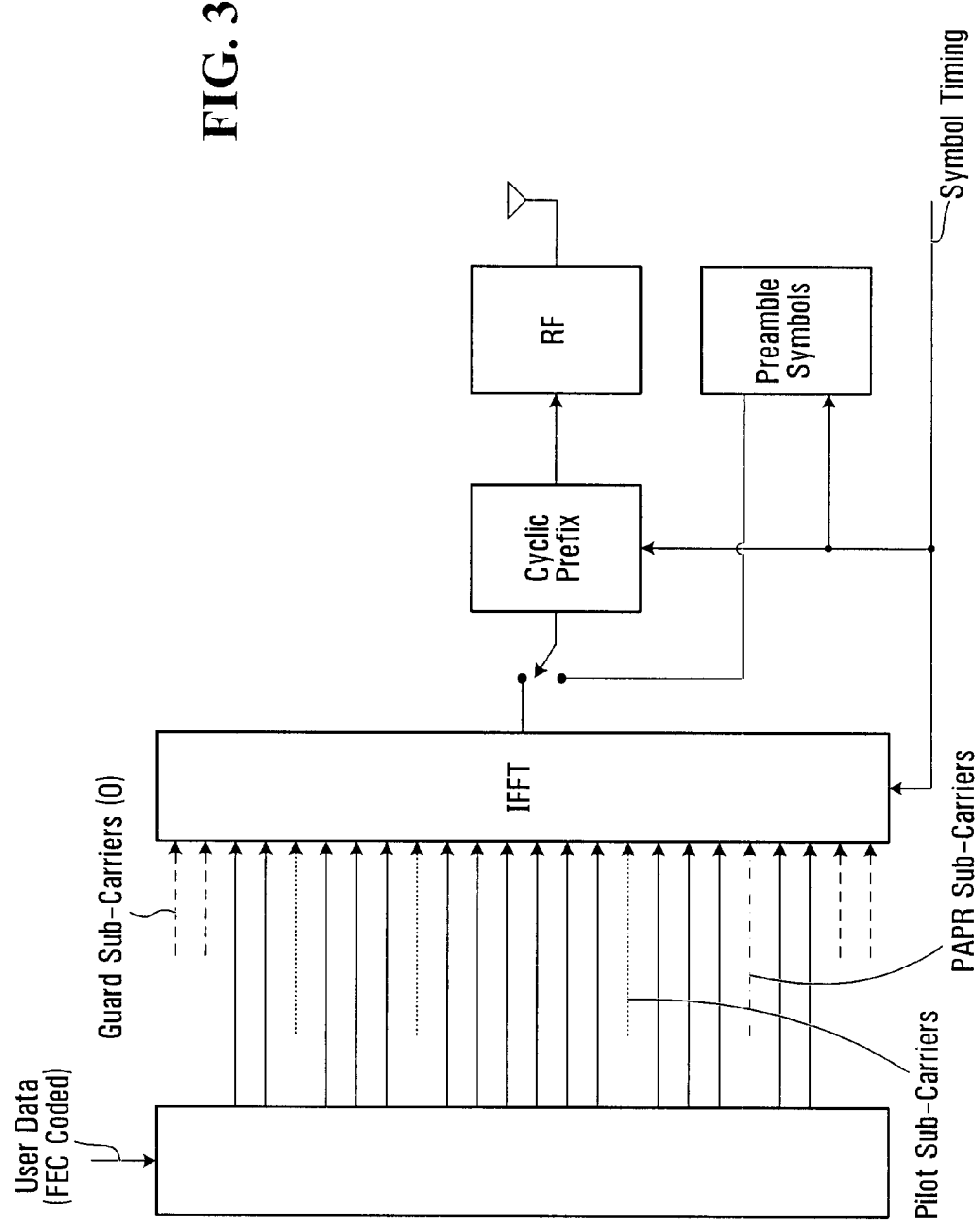
FIG. 3 is a block diagram of an example of an apparatus and process arrangement for forming a broadband radio waveform.

With reference to FIG. 3, the presence in the transmitted signal of the cyclic prefix, the preamble symbols and the organisation of the pilot and data sub-carriers contribute to the easy detectability of the commercial waveform and its ready detection and jamming by an adversary.

Embodiments of the invention provide methods and apparatus whereby the commercial signal waveform is modified to reduce its probability of detection, the communication is made more robust to jamming, the signalling and control information is protected against eves-dropping and the security of the users' data is better protected. While the example techniques outlined in this disclosure are described in the context of the IEEE 802.16 (also known by the commercial name "WiMAX") radio system, the techniques may also be applied to other radio systems.

The techniques applied include reduction of the spectral signature through changes in the data and pilot signals and the symbol timing. The allocation of data and pilot/guard sub-carriers is also modified to disguise the signal characteristics. Protection techniques are also applied to the signalling information flows used to administer the radio operations and to prevent the identity of terminals from being revealed to hostile receivers.

Advantageously, using such methods and systems, radio systems based on commercially derived systems can be made suitable for reliable radio communications use in military (combat, security and public-safety) environments where they may be the subject of hostile interception and jamming, and yet, still provide equivalent performance. The ability to use commercially based systems provides the opportunity to lower costs for the military users through the economies of manufacturing scale that are applied to the commercial systems. The use of systems with a commercial base also facilitates interworking between the military/public-safety radio systems and commercial devices and networks. Such interworking improves coordination and operations in situations of disaster relief.

The techniques applied to the signal are in three areas: (a) reduction in observability of the signal in the band of use (LPD), (b) introduction of waveforms aspects and control signalling to reduce sensitivity to jamming (JR) and (c) use of improved techniques to protect the privacy (security) of the information used for control, signalling, addresses locations etc. and the user's information (LPI). Introducing various combinations of these elements can provide varying degrees of enhanced LPD, JR and LPI. While the embodiments described assume that all three techniques are applied, more generally, any set of one or more of these techniques may be included in a given implementation.

These characteristic features are altered to form an equivalent waveform that is easily detectable by authorised users but is difficult to detect and jam by an adversary.

Cryptographic Keyed Sequence

In some embodiments, the waveform is altered by introducing a cryptographic keyed sequence that scrambles the relation of the data, pilot, dummy and PAPR sub-carriers and their modulation. To receivers without the keying and synchronisation information, all of the sub-carriers and their modulation appear equivalent and it is not possible to untangle the real signal. To receivers with the proper keying and synchronisation information, the various sub-carriers are properly sorted into their respective categories and the information decoded. The nature of the keyed sequence is such that the relationship changes frequently, for example with each symbol, or more often, and so it is not readily detectable by unauthorised receivers. The synchronisation and keying information is made available to parties in the communication by a means that may involve the use of separate signals such as the GPS transmissions, secure channels or pre-programming. Additionally, the cryptographic and synchronisation information may be communicated among the parties using the broadband communications system with suitable secure signalling message formats.

Modification of Cyclic Prefix and Preamble Symbols

To further disguise the waveform, the cyclic prefix and the preamble symbols are also modified. The cyclic prefix, with its inherent ready detectability, may be modified through the use of IOTA/OQAM formats and filters. This modulation technique achieves similar performance for multi-path propagation channels without introducing the easy detectability characteristic of self-correlation of the cyclic prefix. The preamble symbols may also be altered to appear as cryptographic keyed sequences that are only readily detected by authorised users (i.e. those with the proper keying and synchronisation information at the time of reception).

Figure 4:
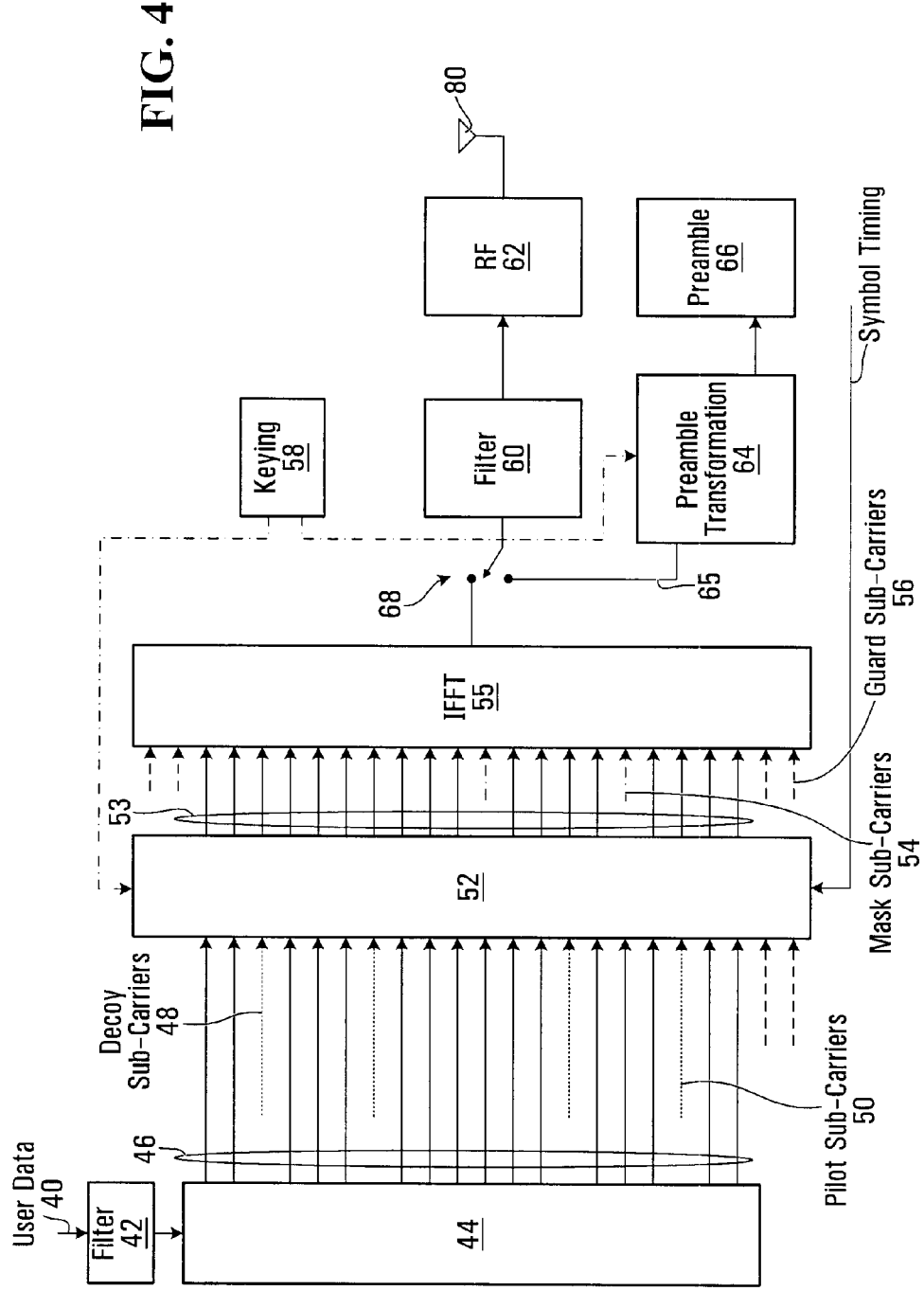
FIG. 4 is a block diagram of an example of an apparatus for altering a waveform in a hostile environment according to an embodiment of the invention.

FIG. 4 is a block diagram of a system/method for altering a commercial waveform for operation in a hostile environment provided by an embodiment of the invention.

User data 40 is filtered in filter 42 to produce filtered user data 44. This low pass filter may be used to suppress undesired high-frequency content of the data. The filtered user data is mapped to data sub-carrier inputs 46 of the security transformation 52. Inputs 48 of the security transformation 52 are used to receive decoy sub-carrier inputs. Inputs 50 of the security transformation 52 are used to receive pilot sub-carriers. The security transformation 52 receives keying information from keying function 58. The transformed output 53 is input to an IFFT function 55. Other inputs to the IFFT function 55 include mask sub-carriers 54 and guard sub-carriers 56. The output 68 of the IFFT 55 is passed through filter 60, RF front end 62 to antenna 80. In addition, a preamble is generated in preamble block 66. This undergoes preamble transformation 64. The output 65 of the preamble transformation 64 and the output 68 of the IFFT 55 are alternatively connected to the filter 60 using switch 68. The Filter 60 is used to ensure localization in time and frequency. This filter may be obtained by applying the Isotropic Orthogonal Transform Algorithm (IOTA) to a Gaussian function. Such a filter has identical response in both time and frequency space.

This approach to protecting the waveform has the advantage that while it disguises the signals to those without the keying information, to those with the keys and the additional processes at the physical layer, the unscrambled signals are identical to the commercial signals and hence may be processed by equivalent apparatus to that used in commercial systems. Thus the protected system can take advantage of experience, techniques, advancement in technology and mass produced cost reductions of the commercial large market systems. These enhancements may, for example, be added as special functional elements to chips that have been otherwise designed for use in the commercial systems. Using the basic chip design preserves the integrity of the overall design/verification and the low costs of mass manufacturing.

The security transformation 52 and the preamble transformation 64 are for mapping the sub-carrier modulations and the preamble symbols respectively.

The use of filter 60 is introduced to form the IOTA/OQAM signal formats.

The security transformation 52 is a transformation that maps each standard sub-carrier and associated user data, pilot and decoy modulation to one or more other sub-carrier. Such a transformation may be obtained, for example, by using a stream cipher sequence generated for each symbol interval from an AES (Advanced Encryption Standard) process with a key and initialisation vector. Of course any other crypto stream process could be used within the scope of the invention. The cipher sequence is used to map the data, pilot and decoy modulation to inputs of the IFFT function 55. A similar sequence is used at the receiver (not shown) to re-map the outputs of the FFT of the received signal to the correct standard set of data, pilot and decoy information.

In some embodiments, the security transformation is a one-to-one mapping.

In some embodiments the mapping is a one-to-many mapping. Note the mapping need not be the same (one-to-one vs. one to many for example) for every sub-carrier location being mapped. If a single user bit is mapped to multiple sub-carriers, giving more sub-carriers than bits, there may be a problem with errors in transmission. That is because, if a bit was transformed to multiple sub-carriers, there is the problem of deciding what is the correct user bit state when the multiple sub-carriers are not all the same at the receiver. In some embodiments, this is addressed using a forward error correcting code. Using the code would map one bit to multiple sub-carriers in such a way that if there are errors in transmission, the correct bit can be decoded, as long as there are not too many errors. However, using such a code would make a special relation among sub-sets of the sub-carriers (i.e. the state of some sub-carriers would be related to others in a way that could become known to the adversary receiver) and this might make the detection of the presence of the signal easier (by looking for the pattern) or making the security transform code easier to break.

In some embodiments, the code is selected to minimise pattern detection and with sub-carrier assignments (of the one to many) scrambled with a crypto code to disguise the pattern.

The decoy sub-carriers 48 are random modulation signals used to expand the bandwidth of the transmitted signal. The random modulation may for example be achieved through the use of another AES cipher stream. This may be operated in such as manner as to avoid providing a known pattern to the adversary receiver. With the introduction of the decoy sub-carriers, which carry no real user or system information, the user and system information is hopped around among the other totality of sub-carriers. This hopping provides protection against jamming of sub-carriers by an adversary.

Similarly, mask sub-carriers 54 are also introduced. These are also random modulated sub-carriers (may also be carefully operated to avoid providing a known pattern to the adversary receiver) that are placed in areas of the channel that may have excessive noise or jamming signals and hence it would be better to avoid placing the useful sub-carriers. However, it is better to not cover these blocked areas of the channel with zero sub-carriers, as such empty places in the channel would assist the adversary receiver in detecting the presence of the signal (due to the "holes"). So mask sub-carriers are placed there so the signal looks the same across the channel to the adversary user, even though some parts of the spectrum are actually not being used. These mask sub-carriers are introduced after the crypto transform (box 52) as these must remain in fixed places to match the jammer signals. They would of course be changes in location if the jammer changed its location in the channel. The sub-carriers used for the decoy and masking are communicated to the authorised receivers through secure control signalling of the communications system or other channels.

In some embodiments, the decoy and mask sub-carriers may be used in another way to help disguise the signature of the transmitted signals. In some embodiments, these "extra" sub-carriers are modulated suitably to make the power spectral density of the composite transmitted signal match that of a radio noise signal. Such a radio noise signal would be chosen, for example, so that the statistics of the composite signal matched a white noise signal. The modulation of the decoy and mask sub-carriers would be chosen over a suitable interval of symbols to make the signal look like noise in the band and suppress any modulation or framing spectral components. The mask and decoy sub-carriers, for example, may be modulated at a different rate than the data and pilot sub-carriers and hence help to suppress spectral components at the modulation rate.

In FIG. 4, the preamble transmission is shown as undergoing a separate transformation 64 during the preamble symbol intervals. This may be implemented by using a common transform process with the user data pilot and decoy symbols as described above. The preamble symbols however, in the commercial system, are special known symbols that have good correlation properties. These symbols are typically used by the receivers to detect the timing of the start of each frame in the downlink and thereby maintain synchronisation of the communications. The preambles are the same symbol sent at regular intervals. With the frequent repetition of the same known symbol, they are vulnerable to a plaintext attack by an adversary receiver. Thus it may be preferable to use a separate cryptographic sequence to disguise the preamble symbols. This may have properties better suited to the repetitive nature of the transmission. Such sequences, for example are used for the protection of covert RADAR systems where repetitive symbols are transmitted. Such sequences are not, however, openly described in the public literature, but would be applicable for this transmission also. Alternatively, an AES derived sequence could be used to disguise the preamble symbols, but with a separate key and initialisation from the sub-carrier transformation in order that discovery of the key used for the preamble would not directly compromise the other aspects of the transmissions.

The illustration in FIG. 4 shows the protection of the transmitted signal through the use of a cipher keyed mapping of information across the sub-carriers.

Figure 5:
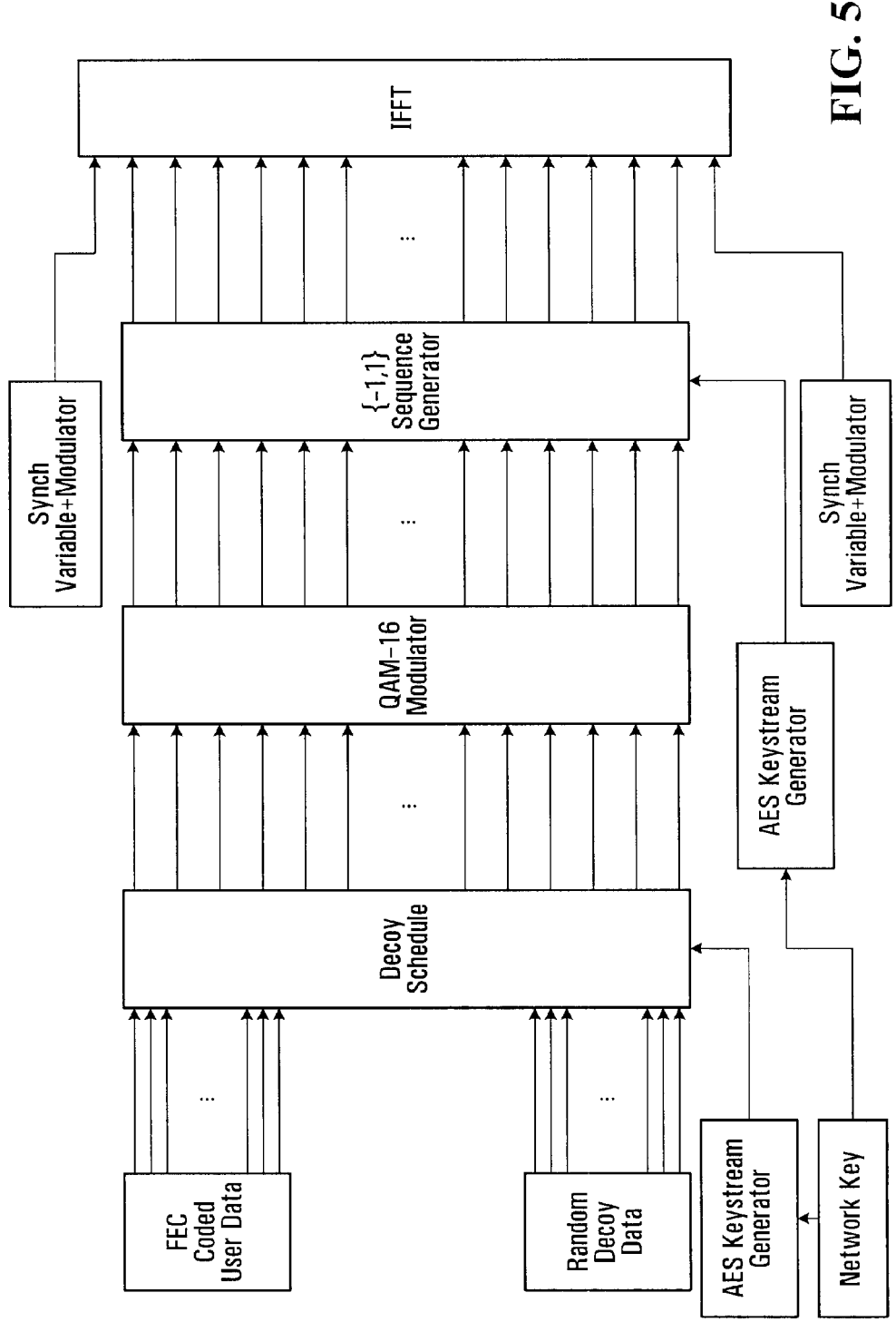
FIG. 5 is a block diagram of an example process of protection in which a cipher keyed alteration of modulation is introduced according to an embodiment of the invention.

FIG. 5 illustrates a further method of protection in which a cipher keyed alteration of the modulation is introduced. This further protects the signals against decoding by unauthorised receivers. Only authorised receivers with the correct cipher key and synchronisation are able to remap the modulation states to their correct values. Thus, the whole of the information stream, both user data and signalling information is protected against unauthorised receivers. This technique may be used by itself to protect a commercial system from unauthorised signal interception and may also be used together with the sub-carrier and preamble mapping discussed as part of FIG. 4 to both protect and disguise the radio signal from detection.

In the configuration illustrated in FIG. 5, decoy information is mixed with the true user data and system signalling information (not shown) according to a keyed decoy schedule. In this illustration, a keyed AES keystream generator is used to schedule the decoy and true user data. Of course any other crypto stream process could be used within the scope of the invention. The combined decoy and user data is then mapped to modulation states. In this example a QAM-16 modulator is illustrated. Of course any other modulation mapping may be used within the scope of the invention. The modulation mapping then passes through a $\{-1, 1\}$ transformation that is directed by a keyed AES crypto keystream. Of course any other transformation may be used within the scope of the invention. The resulting modified modulation states are then passed through the inverse Fourier transform process (IFFT) and formed into an RF signal for transmission by an antenna as illustrated in the similar portion of FIG. 4. With this technique, the radio signal is protected through the introduction of decoy data, and the keyed alteration of the modulation states. Only receivers authorised with the correct keyed crypto sequence and initialisation can properly decode the signal and recover the user data and signalling. In this form, the decoy data may be selected to shape the spectral signature of the composite signal and maintain a profile equivalent to radio signal (or "white") noise. This shaping will make the signal harder to detect by an unauthorised receiver. This technique may be used independently, or combined with the either or both of sub-carrier and preamble symbol mapping techniques illustrated in FIG. 4 to provide a more robust transmission system.

The preamble symbols are also used in the commercial systems to enable the user terminals to readily identify signals from different network stations. A number of different patterns are defined in the commercial standard, and these may be used across a number of network stations so different stations have different patterns and so may be readily identified by the user terminals. In some embodiments, to better protect the identity of the network stations, the preamble codes are assigned to the stations in a way that changes with every frame (or there about) in a cipher coded sequence that is known only to the authorised receivers. Thus, an adversary receiver would not see the same identification coming from fixed network stations and would be unable to directly identify the flow of communications traffic.

As was pointed out in discussion of FIG. 1, the commercial waveform is easily detectable because of the well defined and constant symbol rate and transmission framing. These periodicities in the transmitted signals make significant spectral components. An adversary receiver can make use of these components to discover the transmissions and assist its detection of them. In some embodiments, to better protect the transmissions, a variable symbol rate and frame size may be used. This rate would be determined by a keyed cipher sequence that is known only to the authorised receivers. The consequent variability in the signal timing would disperse the spectral components of the modulation and framing and so make the detection of the signals more difficult for an adversary receiver. This variability in the modulation rates may be applied to all the sub-carriers, or to only the decoy and mask sub-carriers.

As is discussed in the notes for FIG. 1, the uplink transmissions, between user terminals and network stations, differs somewhat from the downlink in that the signals from multiple devices are coordinated together in time and frequency space. The coordination of these transmissions is directed by the network stations through signalling communications channels to the users' terminals to allocate sub-carrier groupings and time slots. In the commercial systems these assignments have a fixed pattern over time and frequency space.

In some embodiments, to better protect the uplink signals in this invention, the user terminal may map its use of modulation sub-carrier group to actual sub-carriers using a similar cipher transformation as used in the downlink. As multiple user terminals must all interlace their individual transmissions across the channel, the same mapping sequence must be used by all terminals. The cipher stream mapping in the uplink could be separate from the stream used in the downlink. The keys and synchronisation for the uplink transmission could be distributed to the user stations from the network using authorised communications signalling channels. As a simpler alternative, the uplink transmissions could advantageously use the same transformation as used for the downlink. In this case the user terminals would map their sub-carrier group usage to actual sub-carriers using the same keyed mapping that they have used to successfully decode the downlink signals. To disguise the presence of decoy and mask sub-carriers, each terminal would transmit on these sub-carriers. This usage would hide the presence and location of these dummy sub-carriers from an adversary receiver. Using the same keyed sequence as the downlink process would simplify the distribution of keying and synchronisation information to the user terminals and thus decrease the signalling load on the system. This operation would also be advantageous for the terminals as once having decoded the downlink signals they would be automatically prepared for uplink transmissions and hence would save time and power for processing.

An aspect of most security systems is protected and reliable distribution of keying and synchronisation information among the communicating devices. In some embodiments, the radio communications system is protected by a number of keyed sequences such as those used to map the modulation to the sub-carriers, the encoding of the preamble symbols, the decoy schedule, the modulation alteration and the uplink transmissions. In some embodiments, a combination of techniques would be used for distribution of keying material among the communicating nodes. These may include for example pre-programmed information and certificates of authorisation, sequences and timing derived from communications channels such as those from the GPS satellites and updating and re-keying information delivered over signalling channels of the communications system or another network.

In some embodiments, the devices to be used in the network are pre-programmed with security certificates and processes that would enable them to be authorised as members of the communications network. The devices may be fitted with multiple certificates that would enable them to be authorised to join multiple networks, perhaps simultaneously. The devices may also be programmed with keying information that would also enable them to receive the network signals. Alternatively, the devices may be programmed to allow access to a suitable network from which additional keying, initialisation and synchronisation information may be derived. The timing information from the GPS system may be used to synchronise the cryptographic processes in the communications network. In addition the signals that are part of the GPS transmissions may be used as a basis for initialisation vectors for the communications cryptosystems. The communications network devices may, for example, use the GPS bit-stream starting at an offset from a common time as an initialisation vector. Different networks could use different offsets to achieve independence, and as the GPS signal is changing constantly, the communications devices are frequently updated with fresh material. An advantage of using a signal such as the GPS stream for synchronisation is that it is available to all terminals and enables them to independently establish synchronisation with the communications network even if they are not able to directly receive the communications channels. Finally, the communications system may use its signalling channels to distribute additional keying information and changes in keys. The signalling may be used, for example, to indicate a new offset in the GPS stream for new keying material.

The invention claimed is:

1. A method comprising:
    generating an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein the OFDM signal decoy and mask sub-carriers are coded using a keyed crypto sequence;

the method further comprising applying modulation of the OFDM signal decoy and mask sub-carriers at a different rate than users data symbols to assist in suppressing modulation spectral components.

2. The method of claim 1 further comprising in place of a cyclic prefix, using filters and IOTA/OQAM modulation formats to suppress detectability of the signal.

3. The method of claim 1 further comprising:
using external signals, such as GPS transmissions or broadcast TV signals, to provide key and synchronisation information for waveform protection.

4. The method of claim 1 further comprising transmitting the OFDM signal.

5. A transmitter comprising:
a processor;
a memory for storing computer executable instructions, that when executed by the processor, implement a method, the method comprising:
generating an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein the OFDM signal decoy and mask sub-carriers are coded using a keyed crypto sequence;
the method further comprising applying modulation of the OFDM signal decoy and mask sub-carriers at a different rate than users data symbols to assist in suppressing modulation spectral components.

6. A method comprising:
receiving a signal generated using the method of claim 1;
applying reverse operations to recover transmitted content.

7. A receiver comprising:
a processor;
a memory for storing computer executable instructions, that when executed by the processor, implement a method, the method comprising:
receiving an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein modulation of the OFDM signal decoy and mask sub-carriers occurs at a different rate than users data symbols to assist in suppressing modulation spectral components, wherein the OFDM signal decoy and mask sub-carriers are coded using a keyed crypto sequence;
applying reverse operations to recover transmitted content.

8. A system comprising:
at least one transmitter comprising:
a processor;
a memory for storing computer executable instructions, that when executed by the processor, implement a method, the method comprising:
generating an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein the OFDM signal decoy and mask sub-carriers are coded using a keyed crypto sequence; and
applying modulation of the OFDM signal decoy and mask sub-carriers at a different rate than users data symbols to assist in suppressing modulation spectral components;
at least one receiver comprising:
a processor;
a memory for storing computer executable instructions, that when executed by the processor, implement a method, the method comprising:
receive a signal generated by the at least one transmitter; and
apply reverse operations to recover transmitted content.

9. A wireless device comprising:
at least one antenna;
a radio frequency front end;
processing circuitry configured to perform at least one of:
1) a) generate an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein the OFDM signal decoy and mask sub-carriers are coded using a keyed crypto sequence; and
b) apply modulation of the OFDM signal decoy and mask sub-carriers at a different rate than users data symbols to assist in suppressing modulation spectral components; or
2) a) receive an OFDM signal decoy and mask sub-carriers in which modulation of the OFDM signal decoy and mask sub-carriers are coded to disguise a spectral signature of a transmission at a modulation and framing rate and to make a composite signal appear as a white noise signal, wherein modulation of the OFDM signal decoy and mask sub-carriers occurs at a different rate than users data symbols to assist in suppressing modulation spectral components; and
b) apply reverse operations to recover transmitted content.

10. The wireless device of claim 9 wherein the processing circuitry comprises at least in part, a processor and memory to store processor executable instructions for implementing actions performed by the processing circuitry.

11. The wireless device of claim 9 wherein the processing circuitry is configured to, in place of a cyclic prefix, use filters and IOTA/OQAM modulation formats to suppress detectability of the signal.

12. The wireless device of claim 9 wherein the processing circuitry is configured to, use external signals, such as GPS transmissions or broadcast TV signals, to provide key and synchronisation information for waveform protection.

13. The wireless device of claim 9 wherein the processing circuitry is configured to transmit the OFDM signal.

* * * * *